United States Patent Office

3,072,633
Patented Jan. 8, 1963

3,072,633
PROCESS FOR PREPARATION AND USE OF CATALYST SUPPORT
Thomas M. Cawthon, Rockaway, Daniel E. Nee, Jr., Randolph Township, Morris County, and Henry H. Richmond, Morristown, N.J., assignors to Allied Chemical Corporation, New York, N.Y., a corporation of New York
No Drawing. Filed Mar. 31, 1959, Ser. No. 803,068
3 Claims. (Cl. 260—94.9)

This invention relates to a novel support for use as one component of a catalyst of low pressure polymerization of normally gaseous olefins such as ethylene, propylene, etc. to normally solid products.

It has been recognized that in low pressure olefin polymerization to solid polymers over a supported catalyst, desirable characteristics of the support include a porous structure and relatively large pore size. By "low pressure" is meant pressures not above about 100 atmospheres. Suitable supports are xerogels obtained by drying particular gels. The drying of these gels is carried to the point of removing at least the more loosely held water and water-soluble liquid therein, usually down to a content of such liquid of at most about 5% by weight. Certain metal phosphates have been proposed as supports in these catalytic polymerizations; but have not been entirely satisfactory in the level of activity displayed.

Moreover it is known that gels can be produced having as at least the major proportion of the continuous phase an at least partially water-soluble neutral organic liquid of lower surface tension than water, e.g. methanol, ethanol, n-propanol, isopropanol, 1-butanol, 2-butanol, isobutanol, tertiary butanol, acetone, methylethyl ketone, dioxane, nitromethane, etc.; and that upon removing any water and said organic liquid, the resulting gels have larger pores than obtainable when water alone is the continuous phase which is removed.

In experiments testing the application of these general principles to production and use of specifically metal phosphate supports for catalysts of low pressure polymerization of gaseous olefins, we have now found that the phosphates of the particular group II metals magnesium and zinc afford supports having high activity for production of solid polymers when prepared by removing from the gel a continuous phase of organic liquid at least partially soluble in water, and having lower surface tension than water, typically an alcohol. This organic phase can permissibly contain a minor proportion by weight of water.

In the following examples we describe completely specific embodiments of our process, illustratively setting forth the best modes contemplated by us of carrying out our invention. However our invention is not to be construed as limited to all details of the examples.

*Example 1*

(A) A magnesium phosphate gel support was prepared and impregnated as follows, parts being by weight:

A solution of 61 parts of magnesium chloride hexahydrate in 2780 parts of methanol was acidified to pH of 2 as measured by a conventional pH meter, by adding 19.6 parts of orthophosphoric acid as 85% acid in water. Dropwise addition of 10.2 parts of ammonia (as 28% ammonia in water) with gentle stirring, followed by a period of quiescence until pH rose to 7.8, resulted in formation of a gel. The gel was filtered and washed 10 times with methanol in amount of 396.5 parts in each wash. Thereby an alcogel was obtained containing 12% of magnesium phosphate.

A portion of this alcogel was slurried with a methanol solution containing 0.096 gram of magnesium dichromate. Thereby the gel was impregnated with magnesium dichromate at a concentration of about 1% of chromium based on the dry weight of magnesium phosphate in the gel.

Then loosely held water and methanol were removed from the impregnated gel by mixing the gel as a slurry with iso-octane and boiling for about 4 hours in proportion of about 2 grams of gel catalyst on the dry basis per 400 ml. of iso-octane, whereby about 50% of the iso-octane was vaporized. The vapors of methanol and any water, formed together with the iso-octane vapors, were condensed and removed to leave a slurry of impregnated magnesium phosphate gel in iso-octane.

This slurried catalyst was employed for ethylene polymerization at a pressure of about 400 p.s.i. and temperature of about 50° C. together with aluminum triisobutyl in a weight ratio of 2 parts of aluminum triisobutyl:1 part gel catalyst on dry basis. In a reaction period of 12 hours, solid polyethylene was formed at an average rate of about 10.5 parts per part of gel catalyst (dry basis) per hour.

(B) Magnesium phosphate alcogel in methanol as the continuous liquid phase was prepared by an alternative procedure, namely by reacting metallic magnesium and phosphoric acid in methanol solution. The methanol was removed by heating the resulting alcogel under autogenous pressure of about 1000–1200 p.s.i. to above the critical point of methanol, i.e. to about 240°–250° C., then venting the pressure vessel. Thereby an aerogel of very fine particle size was obtained. This gel was impregnated with a methanol solution of magnesium dichromate hexahydrate and the methanol and any water were removed therefrom by boiling to dryness with iso-octane. The resulting gel catalyst contained about 1% by weight of chromium in the magnesium phosphate gel support.

This catalyst was further dried by heating at about 300° C. for 3 hours under a flow of dry air and then for one hour under a flow of dry, oxygen-free nitrogen and was cooled under oxygen-free nitrogen.

This catalyst was employed for ethylene polymerization as in Example 1(A) above, except that the pressure was 200 p.s.i. The catalyst produced solid polyethylene at an average rate throughout the reaction period (13.5 hours) of 13.6 parts per part by weight of dry gel catalyst per hour. The polymer had intrinsic viscosity of 23 deciliters per gram, corresponding to molecular weight of about 6,000,000.

*Example 2*

A zinc phosphate gel support was prepared and impregnated as follows, parts being by weight:

A solution of 41 parts of anhydrous zinc chloride in 1190 parts of methanol was acidified to a pH of 3.0 as measured by a conventional pH meter, by adding 19.6 parts of orthophosphoric acid as 85% acid in water. A solution of 46.3 parts of ammonium acetate in 790 parts of methanol was rapidly added with stirring. The gel which formed at pH 3.2 was filtered and washed 7 times with methanol in amount of 396.5 parts in each wash. Thereby an alcogel was obtained containing 15% of zinc phosphate.

A portion of this alcogel was slurried with a methanol solution containing 0.096 gram of magnesium dichromate. Thereby the gel was impregnated with magnesium dichromate at a concentration of about 1% of chromium based on the dry weight of zinc phosphate in the gel.

Then loosely held water and methanol were removed from the impregnated gel by mixing the gel as a slurry with iso-octane and boiling for about 4 hours in proportion of about 2 grams of gel catalyst on the dry basis per 400 ml. of iso-octane, whereby about 50% of the iso-octane was vaporized. The vapors of methanol and any water, formed together with the iso-octane vapors, were condensed and removed to leave a slurry of impregnated zinc phosphate gel in iso-octane.

This slurried catalyst was employed for ethylene polymerization at a pressure of about 200 p.s.i. and temperature of about 50° C. together with aluminum triisobutyl in a weight ratio of 2 parts of aluminum triisobutyl to one part of gel catalyst on dry basis. In a reaction period of 12 hours, solid polyethylene was formed at an average rate of about 5.7 parts per part of gel catalyst (dry basis) per hour.

When alternative catalyst components are incorporated in the above phosphate supports, in lieu of magnesium dichromate, using otherwise like procedures to those of the above examples, catalysts active for ethylene polymerization under the conditions shown in the above examples are obtained. Specific illustrative examples of such alternative components are chromium compounds including magnesium chromate, chromium phosphate, chromium oxychloride, etc.; vanadium compounds including vanadium pentoxide, vanadium oxydichloride, etc.; and titanium compounds including titanium phosphate, titanium trichloride, titanium tetrachloride, etc.

We claim:

1. In a process for polymerizing ethylene to solid polymers by contacting the ethylene with a catalyst comprising a magnesium chromate supported on a metal phosphate and with an aluminum trialkyl, the improvement which comprises utilizing as support a gel obtained by removing water and water-soluble liquid from a gel of the group consisting of magnesium phosphate and zinc phosphate gels having the continuous phase consisting in at least major proportion by weight of an organic liquid at least partially soluble in water and of lower surface tension than water.

2. The improvement defined in claim 1 in which the organic liquid to be removed is an alcohol.

3. The improvement defined in claim 1 in which the organic liquid to be removed is methanol.

References Cited in the file of this patent

UNITED STATES PATENTS

| | | |
|---|---|---|
| 1,882,712 | Andrussow | Oct. 18, 1932 |
| 2,204,157 | Sermon | June 11, 1940 |
| 2,772,244 | Shalit et al. | Nov. 27, 1956 |
| 2,773,836 | Shalit et al. | Dec. 11, 1956 |
| 2,824,089 | Peters et al. | Feb. 18, 1958 |
| 2,824,153 | Kelley et al. | Feb. 18, 1958 |
| 2,825,721 | Hogan et al. | Mar. 4, 1958 |
| 2,850,463 | Romanovsky | Sept. 2, 1958 |
| 2,870,131 | Guillet et al. | Jan. 20, 1959 |
| 2,878,241 | Schnieder | Mar. 17, 1959 |
| 2,912,421 | Juveland et al. | Nov. 10, 1959 |
| 2,930,789 | Kerber et al. | Mar. 29, 1960 |
| 2,978,298 | Wetzel et al. | Apr. 4, 1961 |